United States Patent [19]

Wagner

[11] 4,018,076
[45] Apr. 19, 1977

[54] FIN COMB WITH INTERCHANGEABLE HEADS

[76] Inventor: Stuart J. Wagner, 19930 NE. 22nd Court, North Miami Beach, Fla. 33180

[22] Filed: June 11, 1976

[21] Appl. No.: 694,923

[52] U.S. Cl. .................................. 72/481; 72/457
[51] Int. Cl.² .................... B21D 1/06; B21D 37/04
[58] Field of Search ............ 72/481, 480, 476, 413, 72/457; 15/236 R; 30/314; 81/178, 180 B

[56] References Cited
UNITED STATES PATENTS

| | | | |
|---|---|---|---|
| 438,413 | 10/1890 | Groves | 72/480 X |
| 870,678 | 11/1907 | Henson | 30/314 |
| 1,667,464 | 4/1928 | Wagner | 15/232 UX |
| 2,618,185 | 11/1952 | Fechter | 72/458 |
| 2,711,552 | 6/1955 | Lengyel | 15/236 R |
| 2,912,888 | 11/1959 | Webb | 72/457 |
| 3,041,900 | 7/1962 | Wagner | 72/457 |

Primary Examiner—Milton S. Mehr
Attorney, Agent, or Firm—Stoll and Stoll

[57] ABSTRACT

A fin comb for combing, straightening and cleaning fins of heat exchangers, such as fin-type condensers and evaporators used in refrigeration and air conditioning systems. The fin comb comprises a handle and a plurality of fin combing heads which are interchangeably mounted on the handle. The fin combing heads are provided with fin-shaped teeth of different thickness and spacing for engaging heat exchanger fins of different thickness and spacing. The fin combing heads are also reversible on the handle to adapt the fin comb to both pulling and pushing strokes relative to the heat exchanger fins. The fin combing heads are color coded for easy selection of the right size for the various heat exchanger fin assemblies which are normally encountered by refrigeration and air conditioning servicemen.

4 Claims, 15 Drawing Figures

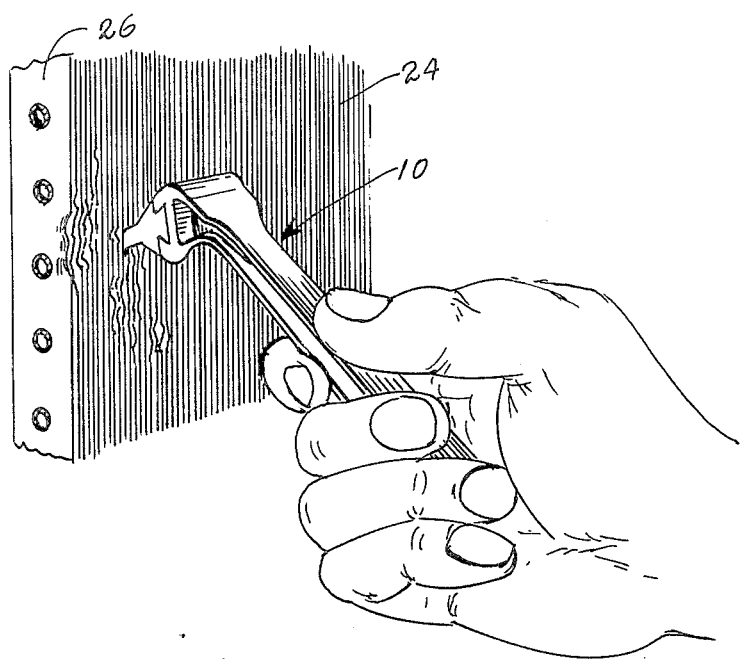
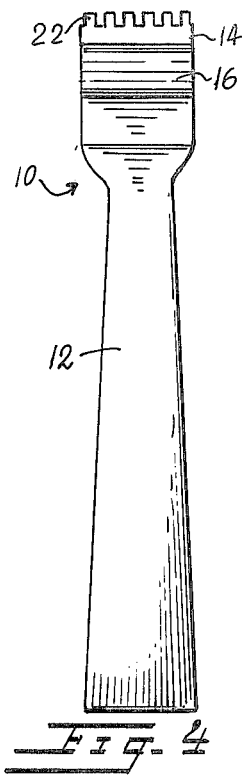
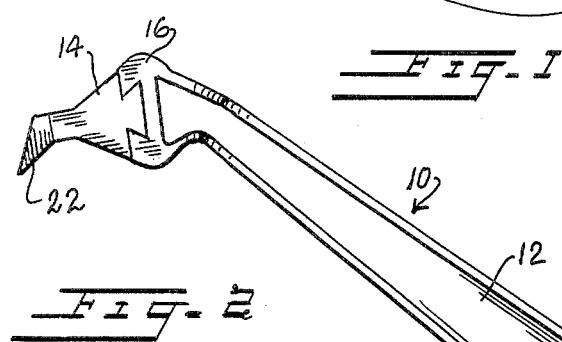
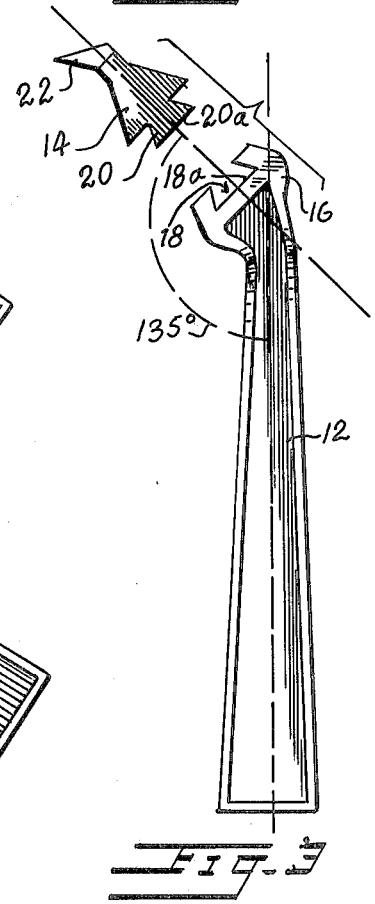
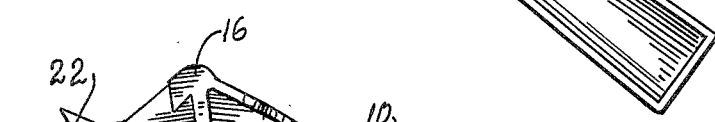
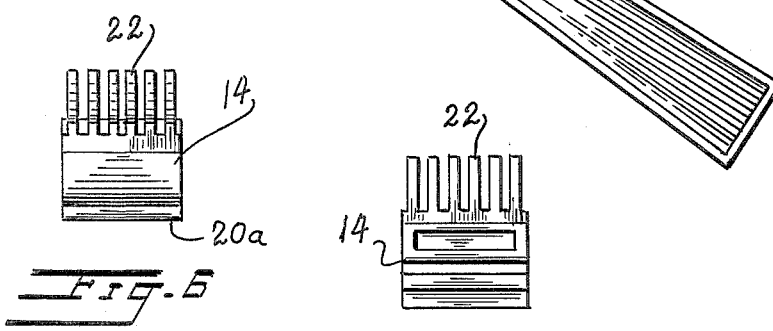
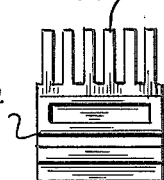

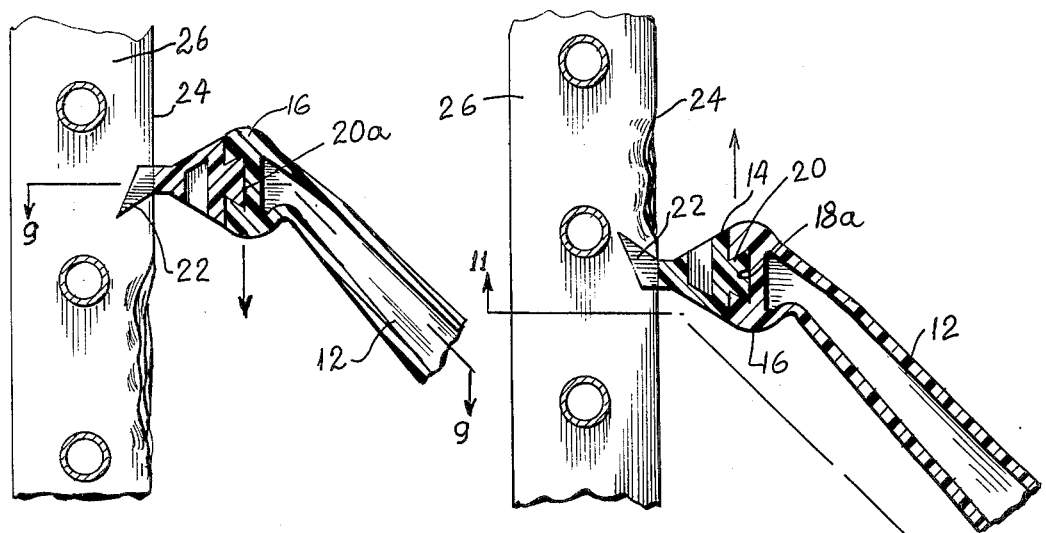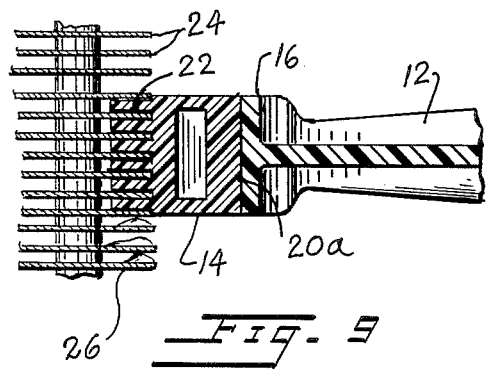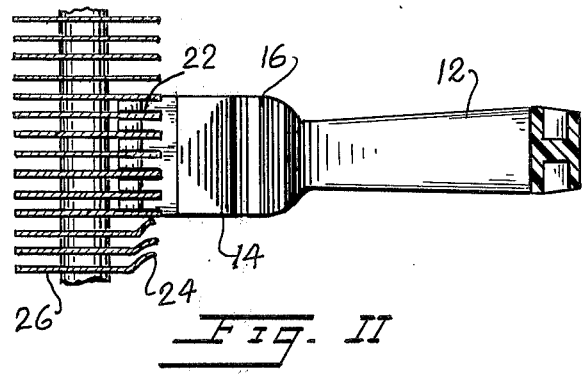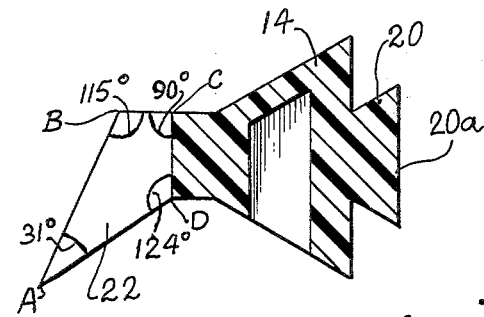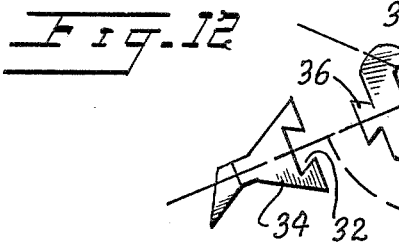

FIN COMB WITH INTERCHANGEABLE HEADS

BACKGROUND OF THE INVENTION

1. Field of the Invention

The refrigeration and air conditioning field and other fields where heat exchange fins are installed, e.g., finned heating systems.

2. Prior Art

The most pertinent prior art known to applicant comprises the following United States patents:

Dorman — 49,245
Darling — 1,739,214
Leigh — 2,222,081
De Rop — 2,314,034
Fechter — 2,618,185
Pille — 2,818,757
Johnson — 2,895,358
Rhoads — 2,909,954
Webb — 2,912,888
Wagner — 3,041,900

While these prior patents clearly show the use of fin straightening combs, they do not show such combs equipped with interchangeable and reversible heads adapted to engage fin assemblies of different fin thickness and spacing and to be operated with pull or push strokes.

SUMMARY OF THE INVENTION

This invention provides a fin comb which is adapted to be used in straightening or cleaning heat exchanger fins (or the like) having different thickness and spacing. The fin comb is equipped with a plurality of fin combing heads, each having fin-shaped teeth of different thickness and spacing to engage heat exchanger fins of corresponding thickness and spacing. These heads are interchangeably mounted on a handle so that a single handle may be used with a plurality of heads. Additionally, the heads are reversible on the handle, so that they may be pulled or pushed along the heat exchanger fins, as desired or required.

Specifically, a dovetail joint connects the heads to the handle. In the preferred form of the invention, the handle has a dovetail-shaped mortise formed therein and the heads have a dovetail-shaped tenon formed thereon to engage the mortise. A reverse arrangement is equally feasible, i.e., a handle with a dovetail-shaped tenon and heads with a dovetail-shaped mortise engageable therewith.

In either case, the heads are color-coded in relation to the thickness and spacing of their fincombing teeth. This facilitates selection of the right head for each fin assembly which is to be straightened or cleaned or both.

Another important feature of the invention resides in the offset angling of the heads relative to the handle for a more comfortable operation with reduced likelihood of injuring the hand against the heat exchanger fins.

A further feature resides in the use of different materials for the handle and heads. Both are molded of plastics of any suitable kind, but since the functions of these components are different, so are, or at least may be, the plastics of which they are made. For example, strong, durable, abrasive-resistant materials for the heads are nylon and Teflon. These materials will straighten deformed heat exchanger fins without damaging them. The handle may be made of strong, less expensive plastics, e.g., polyethylene or polystyrene.

BRIEF DESCRIPTION OF THE DRAWING

FIG. 1 is a perspective view showing how the fin comb which is herein claimed is used in straightening the fins of a heat exchanger, the fin head being positioned for a pulling stroke.

FIG. 2 is a side view of said fin comb.

FIG. 3 is an exploded side view thereof.

FIG. 4 is a back view thereof.

FIG. 5 is a side view, similar to that of FIG. 2, but showing the head reversed on the handle for a pushing stroke.

FIG. 6 is a back view of one of the fin heads.

FIG. 7 is a face view of said fin head.

FIG. 8 is a fragmentary, sectional view showing the fin comb in use on heat exchanger fins, the head being positioned on the handle for a pulling stroke.

FIG. 9 is a section on the line 9—9 of FIG. 8.

FIG. 10 is a view similar to that of FIG. 8 but showing the head reversed for a pushing stroke.

FIG. 11 is a sectional view on the line 11—11 of FIG. 10.

FIG. 12 is an enlarged, fragmentary side view showing the preferred shape of the comb teeth of the present invention.

FIG. 13 is a view similar to that of FIG. 6, showing a second fin head having comb teeth of different thickness and spacing, said second fin head being interchangeable with the fin head of FIG. 6. FIG. 14 is a view similar to that of FIGS. 6 and 13 showing a third fin head having comb teeth of still other thickness and spacing, and interchangeable with the fin heads of FIGS. 6 and 13.

FIG. 15 is an exploded side view of an alternative form of this invention, wherein the dovetail-shaped mortise is formed in the fin head and the dovetail-shaped tenon is formed on the handle, all other parts and features of the invention remaining the same.

DESCRIPTION OF PREFERRED EMBODIMENTS OF INVENTION

Referring now to the first form of the invention as illustrated in FIGS. 1–14 of the drawing, it will be seen that fin comb 10, herein claimed, comprises a handle 12 and a head 14 detachably mounted on the handle, both, preferably, molded of strong durable plastics. The head, for example, may be molded of nylon resins (polyamides) or Teflon resins (polytetrafluoroethylene), both made by E. I. Du Pont De Nemours & Co., Wilmington, Delaware. These are strong, abrasion-resistant materials which will straighten deformed heat exchanger fins without damaging them. The handle may be made of any suitable strong material conventionally used for tool handles and other applications, e.g., phenolic resins, polethylene, polystyrene and others. Alternatively, the handle may be made of material other than plastics, e.g. wood or metal.

The handle may have any suitable, convenient shape, but its upper end 16, which serves as a receptacle or holder for the head, is offset from the longitudinal axis of the handle and disposed at an angle of approximately 135 degrees relative to said axis. When head 14 is mounted on said upper end 16 of the handle, the head is offset from the handle and angled therefrom at approximately 135°. See FIG. 2. As has above been noted, this enables the operator to hold the device at a convenient angle and it helps prevent injury to the hand from contact with the heat exchanger fins.

A dovetail-shaped mortise 18 is formed in the upper end 16 of the handle, and it will be understood that the base line of the mortise is positioned at an angle of approximately 45° relative to the longitudinal axis of the handle. Hence, a line perpendicular to the base of the mortise intersects the longitudinal axis of the handle at the above mentioned angle of approximately 135°.

A complementary dovetail-shaped tenon 20 is formed on the base of head 14 for engagement with the dovetail-shaped mortise in the handle in order to detachably mount the head on the handle. Accordingly, a line perpendicular to the base of the tenon, will coincide with a line drawn perpendicular to the base of the mortise, and both lines will intersect the longitudinal axis of the handle at said angle of approximately 135°. This is an approximate angle and may be varied within a relatively wide range, e.g. from approximatedly 120° to approximately 150°, to meet individual preferences.

At the free, forward end of head 14, opposite the tenon, is a plurality of fin-shaped comb teeth 22 which are dimensioned and spaced to intermesh or interleave with fins 24 of heat exchange 26. However, since the thickness and spacing of the fins on different types and sizes of heat exchangers vary, it is necessary to provide fin-shaped comb teeth which complement the various thicknesses and spacing of the heat exchanger fins. Accordingly, the present invention provides a plurality of heads 14, 14a and 14b which are alike in all respects except in the thickness and spacing of their respective comb teeth.

Purely by way of illustration, comb teeth 22 of head 14 are relatively thick and widely spaced and there are only six teeth on the head. They are equally spaced and there are eight teeth per inch. Head 14a has nine teeth 22a and they run eleven teeth to the inch. Head 14b has eleven teeth 22b with fourteen per inch. As stated, these are illustrative figures, determined by the the thickness and spacing of the various heat exchanger fins. In actual practice, the present invention provides six heads with eight, nine, ten, eleven, twelve and fourteen teeth to the inch, respectively. Each head is in a different color for quick selection in the field.

Referring now to FIG. 12 which shows the preferred shape of the comb teeth, it will be observed that they have a generally hook-shape in face view, the lead point a defining a sharply acute angle, to wit, 31°. Reading in clockwise direction, as viewed in FIG. 12, the comb teeth define corners b, c and d which define 115, 90 and 124 degree angles, respectively. Line cd represents the base wall between teeth and, as FIG. 8 indicates, this wall is normally held parallel to the heat exchanger fins during the fin-straightening operation. Stated differently, the base wall corresponding to line cd serves as a guide against the fins.

Line cd parallels the tenon base 20a which, in turn, parallels mortise base 18a when the head is mounted on the handle. It is this relationship which is the frame of reference for the 135° angle between the head and the handle above mentioned.

Referring now to FIG. 15, it will be understood that the above description of fin comb 10 applies equally to fin comb 30 except for the dovetail-shaped mortise and tenon joint. In the first form of the invention mortise 18 is formed in the handle while tenon 20 is formed on the head. In the second form of the invention, illustrated in FIG. 15, mortise 32 is formed in head 34 and tenon 36 is formed on handle 38. In all other respects fin comb 30 corresponds to fin comb 10.

The foregoing is a description of preferred forms of the invention and it will be understood that variations and modifications may be embodied therein, within the scope of the appended claims, to apply the invention to the various dimensions and spacing and other features of heat exchanger fins and the like which are encountered by servicemen.

I claim:
1. A fin straightening and cleaning comb, comprising:
    a. a handle and a plurality of heads interchangeably mountable on said handle,
    b. each said head having a plurality of comb teeth formed thereon in spaced relationship,
    c. the comb teeth being angled relative to the head to define a generally hook-shaped comb oriented in one direction relative to the handle for a pull-stroke fin straightening or cleaning operation,
    d. the head being reversible on the handle to orient the hook-shaped comb in the opposite direction relative to the handle for a push-stroke fin straightening or cleaning operation,
    e. the thickness and spacing of the comb teeth on each said head differing from the thickness and spacing of the comb teeth on each of the other heads to complement the thickness and spacing of the fins which are to be straightened or cleaned,
    f. each said head and said handle being adapted to be joined by a dovetail-shaped mortise and tenon joint,
    g. the base wall of the mortise and the base wall of the tenon being disposed at an angle of approximately 45° to the longitudinal axis of the handle,
    h. whereby the heads are disposed at an angle of approximately 135° to said longitudinal axis,
    i. said comb teeth having base walls between them which are normally held parallel to the fins to which the comb is being applied,
    j. said base walls between the comb teeth being parallel to the base walls of the mortise and tenon joint, and
    k. said comb teeth being angled relative to the base walls between them and to the base walls of the mortise and tenon joint to form a hook-shaped configuration relative to the longitudinal axis of the handle.
2. A fin straightening and cleaning comb in accordance with claim 1, wherein:
    a. the handle has an offset end and the mortise is formed in said offset end,
    b. the tenon is formed on each said head for detachable engagement with the mortise.
3. A fin straightening and cleaning comb in accordance with claim 1, wherein:
    a. the handle has an offset end and the tenon is formed on said offset end,
    b. the mortise being formed in each said head for detachable engagement with the tenon.
4. A fin straightening and cleaning comb in accordance with claim 1, wherein:
    a. the comb teeth define a four-sided figure in face view,
    b. one side defining a base line which coincides with the base walls between the comb teeth,
    c. said base line being parallel to the base walls of the mortise and tenon joint,
    d. said four-sided figure having base angles of approximately 90 and 124°, a sharply acute angle of approximately 31°, and a fourth angle of approximately 115°.

* * * * *